United States Patent

[11] 3,604,129

[72] Inventor Robert M. Eisenberg
Derwood, Md.
[21] Appl. No. 881,965
[22] Filed Dec. 4, 1969
[45] Patented Sept. 14, 1971
[73] Assignee Singer-General Precision Inc.
Binghamton, N.Y.

[54] BREATH SOUND GENERATOR
10 Claims, 10 Drawing Figs.
[52] U.S. Cl. ..................................... 35/17,
332/31 R
[51] Int. Cl. ............................... G09b 23/28
[50] Field of Search ........................ 35/17, 19
A; 332/31 R, 31 T, 37 R

[56] References Cited
UNITED STATES PATENTS
3,384,981 5/1968 Baessler et al. .............. 35/17
3,508,347 4/1970 Keefer .......................... 35/17

*Primary Examiner*—Harland S. Skogquist
*Attorneys*—Francis L. Masselle and William Grobman

ABSTRACT: Apparatus is described for generating electrical signals having the same general waveform as the waveform of the sound produced by human breathing. The apparatus comprises a sinusoidal generator, means for adding a DC bias to said sinusoidal wave, means for accepting the two polarities of the sinusoidal wave, means for operating on the two halves separately, and means for combining the two halves into a single waveform and using that waveform to modulate a white noise source.

INVENTOR.
ROBERT M. EISENBERG
BY
William Grobman

INVENTOR.
ROBERT M. EISENBERG
BY
William Grotman

BREATH SOUND GENERATOR

This invention relates to a system for generating electrical signals which can be used to duplicate sounds produced in the human body.

As the population of the world increases, the need for additional medical help also increases. Partially because of the long time required for the training of such individuals, there has been a substantial shortage of trained medical personnel throughout the would for a number of years. In order to increase the number of individuals trained each year, research has been conducted to change and improve the methods of educating such personnel. As with many other complex fields, the training of medical students is leaning more and more upon mechanical training aids, such as simulators.

In the past it has been difficult to simulate the operation of the human body in a manner suitable for training medical personnel. One of the reasons for this difficulty is the problems encountered in designing apparatus which functions as a normal body would but which also permits the insertion of malfunctions. The malfunctions must, of course, be controlled and must duplicate those which are ordinarily found in bodily malfunctions.

It is an object of this invention to provide a new and improved system for duplicating human body sounds.

It is another object of this invention to provide a new and improved apparatus for duplicating the sound of breathing.

It is a further object of this invention to provide a new and improved apparatus for duplicating the sound of human breathing, both normal and abnormal.

It is still another object of this invention to provide a new and improved electrical device for generating electrical signals having an envelope similar to the envelope of the sounds produced by breathing.

Other objects and advantages of this invention will become more apparent as the following description proceeds, which description should be considered together with the accompanying drawings in which:

FIG. 1 is a curve which illustrates the waveform to be duplicated;

FIG. 2, 3, 5, 6, and 7 are waveforms for explaining the operation of the apparatus of this invention;

Figure 1:
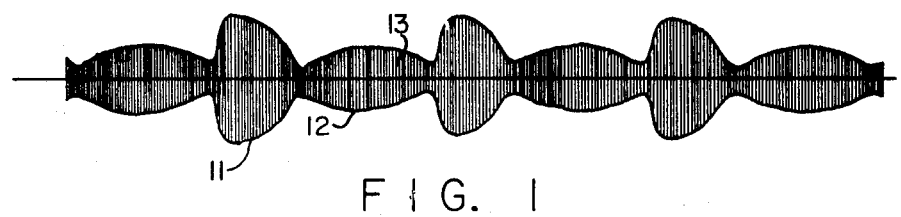

Referring now to the drawings in detail and more particularly to FIG. 1, a curve is shown which generally duplicates the waveform of the sound of normal breathing. The curve of FIG. 1 is symmetrical about a zero line. The abscissa of this chart represents time, and ordinate represents amplitude. Several complete cycles are shown each comprising two parts, a first part 11 and a second part 12. The curve is actually the modulation envelope of noise 13 which is amplitude modulated. A complete cycle of the breathing sound comprises the two parts 11 and 12, where 11 represents the sound generated in inhaling and the portion 12 represents the sound generated while exhaling. Neither of the portions 11 or 12 comprises a half cycle, and the portion 12 is substantially longer than the portion 11.

Figure 2:
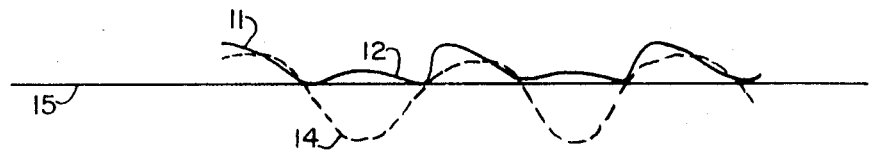

In generating a signal which approximates that shown in FIG. 1, one of the first steps performed in this invention is to provide a sine wave having the same wavelength L as a complete cycle such as shown in FIG. 1. In FIG. 2, the envelope of the curve of FIG. 1 is shown after is has been "rectified," and only the upper half is shown. The two parts are designated 11 and 12 as they also are designated in FIG. 1. Shown superimposed upon the two portions 11 and 12 in FIG. 2 is a sine wave 14 to illustrate that a complete cycle of the sine wave 14 is equivalent to a complete cycle of the breathing sound. As shown in FIG. 2 both waves are symmetrical about the zero axis 15, but even though the sine wave 14 is a good start toward developing the desired waveform, its shape does not begin to approximate even half of the envelope as shown in FIG. 2.

Figure 3:
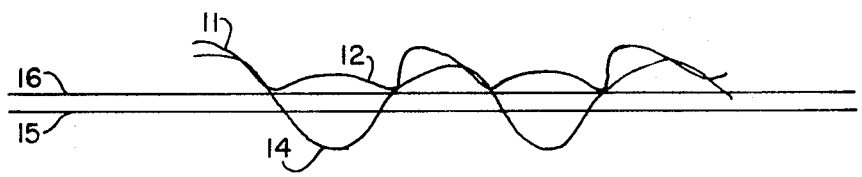

However, displacing the zero axis 15, as shown at 14 in FIG. 3, the sine wave 14 can be given the same crossover points as the breathing waveform. In FIG. 3 the upper portion of the breathing envelope, designated 11 and 12, is shown and the sine wave 14 is shown in an upwardly displaced zero axis 16. By moving the axis 15 to the new position shown at 16, the points at which the sine wave 14 intersect the axis 16 can be made to coincide with the points at which the breath sound envelope also cross the axis 16. This means that a complete cycle of the sine wave 14 is now broken into two parts which are unequal in size but which coincide in length with the two parts 11 and 12 with the breath sound envelope. It is now necessary to modify the shapes of these two portions so that they are similar in shape to the two portions 11 and 12.

Figure 4:
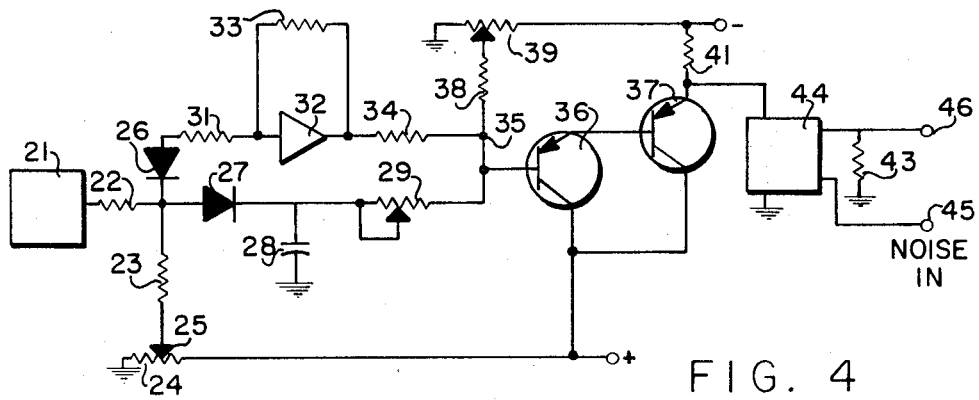
FIG. 4 is a schematic circuit diagram of apparatus according to this invention.

To accomplish this entire process the circuit shown in FIG. 4 has been devised. An oscillator 21 feeds its output through a resistor 22 to the junction of a pair of diodes 26 and 27. This junction is connected through a resistor 23 to the slide contact 25 of a potentiometer 24. One end of the potentiometer 24 is connected to ground and the other end is connected to a source of positive potential. The anode of the diode 27 is connected to the cathode of the diode 26, and the cathode of the diode 27 is connected through a capacitor 28 to ground and through a potentiometer 29 to the base electrode of transistor 36. The anode of the diode 26 is connected through a resistor 31, an amplifier 32, and a resistor 34 to the base electrode of the transistor 36. The base electrode of the transistor 36 is also connected through a resistor 38 to a potentiometer 39, one end of the potentiometer 39 being grounded and the other end being connected to a source of negative potential. The transistor 36 has its collector electrode directly to the source of positive potential and also to the collector electrode of a transistor 37. The emitter electrode of the transistor 36 is directly connected to the base electrode of the transistor 37. The emitter electrode of the transistor 37 is connected through a resistor 41 to a source of negative potential and to one input of an amplitude modulator 44. The modulator 44 has an input terminal 45 adapted to be connected to a source of white noise, and the output from the modulator 44 is taken from a terminal 46 across an output resistor 43.

Figure 5:
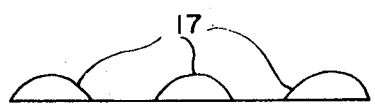
Figure 6:
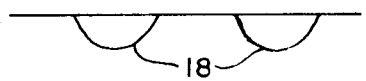
Figure 7:
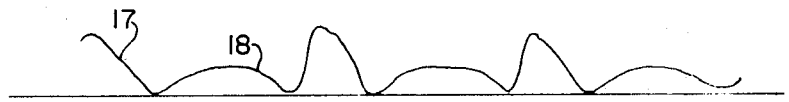

In operations, the output from oscillator 21 is applied to the junction of the pair of diodes 26 and 27. At the same time, the junction between the two diodes 26 and 27 is also connected through the potentiometer 24 to the source of positive potential so that an adjustable potential can be applied to the two diodes 26 and 27 to bias them. Actually, the junction formed by the resistors 22 and 23 serves to add the potential from the source of positive potential and the output of the oscillator 21 so that the zero line of the oscillatory output from the oscillator 21 is moved out of the line of symmetry of that wave. This nonsymmetrical sine wave is rectified by two diodes 27 and 26 and the resultant waveforms are shown in FIGS. 5 and 6. The rectified positive portion 17 of the sine wave shown in FIG. 5 is that which passes through the diode 26 and is applied to the amplifier 32. The negative portion 18 of the sine wave shown in FIG. 6 is the portion rectified by the diode 27 and is applied to the potentiometer 29. The resistor 34 and the potentiometer 29 provide a summing network with the potentials in the two paths being added together at the junction point 35. The amplifier 32 inverts the positive portion 17 which passes through the diode 26 so that the potentials applied to the junction between 35 are of the same polarity. These potentials are also applied to the base electrode of the transistor 36 which is connected together with transistor 37 in a Darlington circuit. FIG. 7 shows the combined waveform but does not show the effect of the capacitor 28 which is used to lengthen the curve 18 and to decrease its amplitude. The capacitor 28, operating with the potentiometer 29, serves to integrate the negative portion of the waveform 18. The output from the Darlington amplifier is taken across the resistor 41 and is applied to the modulator 44. The other input, which is the carrier and may be supplied from any source of noise such as a white noise generator, is applied to the input terminal 45 of the modulator 44. The signal applied to the modulator 44 from the transistor 37 modulates the amplitude of the noise potentials applied to input terminal 45. At the same time, the modulator 44 converts the half-wave signals shown in FIG. 7 into full-wave signals which are symmetrical about a central axis and which are similar to those shown in FIG. 1. In addition to its use as a summing resistor and its operation with its capacitor 28 as an integrator, the potentiometer 29 may also be used to adjust the relative amplitude between the two portions 17 and 18 of the complete cycle. The modulator 44 may be any suitable amplitude modulator which will amplitude modulate the noise input with the waveform from transistor 37.

Figure 8:
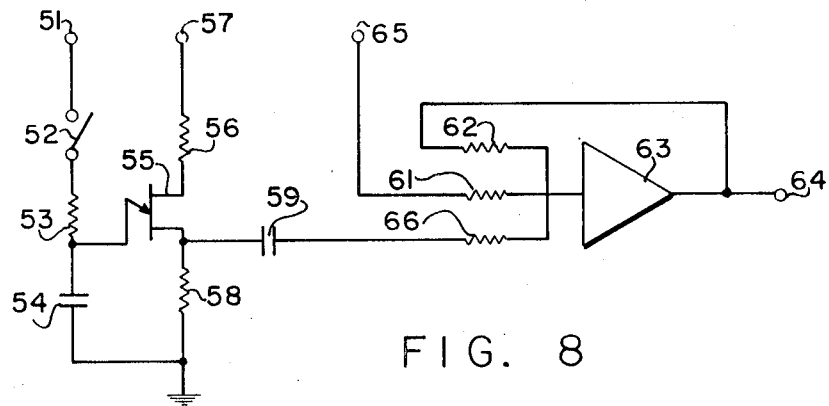
FIG. 8 is a schematic circuit diagram of apparatus for generating abnormal breath sounds.

As indicated above, the addition of pathological sounds—sounds which duplicate the abnormal activities of bodily organs—is important to the training objectives of the apparatus of this invention. A circuit for producing and adding one type of such sounds, by way of example, is shown in FIG. 8. The malady whose sound is duplicated by the circuit of FIG. 8 is called "rales," a main identifying feature of which is a rasping, varying low frequency sound generated principally upon exhalation. In FIG. 8 an input terminal 51 is adapted to be connected to the output of the amplifier 32 in FIG. 4. The terminal 51 is connected through a switch 52, a resistor 53, and a capacitor 54 to ground. The junction of the resistor 53 and the capacitor 54 is connected to the emitter electrode of a unijunction transistor 55 whose base 2 electrode is connected through a resistor 56 to a terminal 57 which is connected to a source of positive potential. The base 1 electrode of the transistor 55 is connected through a resistor 58 to ground, and the junction of the resistor 58 and the base 1 electrode of the transistor 55 is connected through a coupling capacitor 59 and a resistor 66 to one input of an operational amplifier 63. The amplifier 63 has two other inputs, one of which is connected through a resistor 61 to a terminal 65, and the other of which is connected through a resistor 62 to the output of the amplifier 63. An output terminal 64 is also connected to the output of the amplifier 63.

In operation, the unijunction transistor 55 serves as a low-frequency oscillator. When the circuit of FIG. 8 is first energized, the transistor 55 is nonconductive and the capacitor 54 is uncharged. The terminal 51 is connected to the output of the amplifier 32 in FIG. 4, and when a positive potential is applied to the terminal 51, the capacitor 54 begins charging toward that potential. When the potential across the capacitor 54 reaches the breakdown or triggering voltage of the transistor 55, that transistor conducts, drawing current from the source connected to the terminal 57 and dropping the potential at its base 2 electrode due to the potential drop through the resistor 56. Conduction through the transistor 55 also reduces the resistance of the base-emitter circuit, causing the capacitor 54 to discharge rapidly through that circuit. When the potential of the discharging capacitor 54 drops below the triggering potential of the transistor 55, that transistor becomes nonconductive, and the cycle begins again. From the above, it becomes clear that the operation of the low-frequency oscillator depends upon the presence of a positive potential having sufficient amplitude to trigger the transistor 55 at the terminal 51. Thus, the operation of the oscillator in the rales generator of FIG. 8 is synchronized with the generation of the exhalation portion 18 of the breathing envelope. The output of the low-frequency oscillator is taken from the junction of the base 1 electrode and the resistor 58 and is applied through the coupling capacitor 59 and the resistor 66 to one input of the amplifier 63. The network of resistors 66, 61 and 62 comprises a summing network at the input to the amplifier 63, and when the terminal 65 is connected to the output of the breathing envelope generator of FIG. 4, the two signals from the two generators are summed in the amplifier 63.

Figure 9:
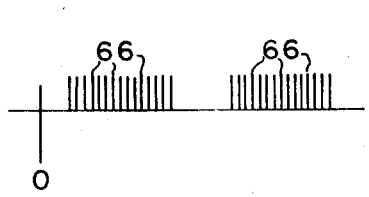
FIGS. 9 and 10 are additional waveforms generated by the apparatus of this invention.
Figure 10:
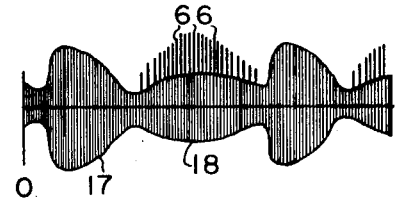

To simulate the condition of rales, the generator of FIG. 8 must generate short duration pulses which are superimposed upon the normal breathing waveform from the circuit of FIG. 4. Thus, it is important that the two generators be synchronized. In addition, the potential applied to the input terminal 51 controls the frequency at which the short duration pulses are generated by the circuit of FIG. 8. As the potential applied to the terminal 51 increases, the time required for the capacitor 54 to charge to trigger potential decreases. Thus, as the exhalation portion 18 of the complete breathing cycle rises to its maximum value, the frequency of the rales signals also increases. The short duration pulses generated by the circuit of FIG. 8 are shown in FIG. 9. When these signals are applied to a sound transducer, they produce the rasping sound heard in cases of rales. The switch 52 permits the insertion of the malady into the normal breathing envelope whenever desired to indicate the difference between normal breathing and abnormal breathing as mentioned above. The waveform of the total sound is shown in FIG. 10 which shows the synchronization of the short duration pulses of FIG. 8 and the breathing envelope of FIG. 4, and the manner in which the amplitude of the short duration pulses is added to the instantaneous amplitude of the breathing envelope. In the system shown in FIG. 8, the output of the circuit of FIG. 4 is applied to the input terminal 65, and the output from the entire system is taken from the output terminal 64. Thus, when the switch 52 is closed, the output from the terminal 64 is the waveform shown in FIG. 8, and when the switch 52 is open, the output from the terminal 64 is that shown in FIG. 1.

This specification has described new and improved apparatus for generating waveforms of the sounds produced by animal bodies, in particular human bodies. The apparatus described and illustrated indicates means for generating both normal and abnormal sound waveforms. It is realized that the above description may indicate to those in the art additional ways in which the principles of this invention may be used without departing from its spirit. It is, therefore, intended that this invention be limited only by the scope of the appended claims.

What is claimed is:

1. A system for generating waveforms which duplicate those of normal bodily sounds, said system comprising means for generating a sine wave, means for distorting said sine wave to form a recurring wave of the same frequency as said sine wave, an amplitude modulator, and means for supplying a high-frequency signal and said recurring wave to said modulator so that said recurring wave amplitude modulates said high-frequency signal.

2. The system defined in claim 1 wherein said distorting means includes a voltage adder, means for applying said sine wave to said adder, and means for applying a constant voltage to said adder to displace said sine wave from its normal position symmetrical about its zero axis.

3. The system defined in claim 2 further including a first path and a second path, a first diode connecting the output from said adder to said first path to apply one polarity portion of said displaced wave to said first path, and a second diode connecting the output from said adder to said second path to apply the other polarity portion of said wave to said second path.

4. The system defined in claim 3 wherein said first path further includes an inverter to change the polarity of said one polarity portion so that the said one and said other portions are of the same polarity.

5. The system defined in claim 4 wherein said second path includes voltage integrating means for lengthening said other portions with respect to said one portion.

6. The system defined in claim 5 further including voltage-combining means having at least two inputs and an output, means for connecting the output of said first and second paths to said inputs, amplifier means connected to said output, and means for connecting the output from said amplifier means to said modulator.

7. The system defined in claim 6 further including means for modifying the waveforms generated by said system to generate waveforms of abnormal body sounds, said means including a switch for connecting said means with said system.

8. The system defined in claim 7 wherein said means for modifying the waveforms comprises an oscillator, means for connecting said oscillator to one side of said switch, and means for connecting the other side of said switch to the output of said inverter so that said oscillator is biased to operate only during said one portion of said waveform.

9. The system defined in claim 8 wherein said means for modifying the waveform comprises a summation amplifier having at least two inputs, means for connecting the output of said oscillator to one input and means for connecting the output of said modulator to the other input, the output of said summation amplifier providing said abnormal waveforms.

10. The system defined in claim 9 wherein said oscillator generates pulses of short duration compared to said one portion.